US 9,325,739 B1

(12) United States Patent
Roth et al.

(10) Patent No.: US 9,325,739 B1
(45) Date of Patent: Apr. 26, 2016

(54) DYNAMIC SECURITY POLICY GENERATION

(71) Applicant: Amazon Technologies, Inc., Reno, NV (US)

(72) Inventors: Gregory Branchek Roth, Seattle, WA (US); Daniel Stephen Popick, Seattle, WA (US); Jonathan Weiss, Berlin (DE)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/873,055

(22) Filed: Apr. 29, 2013

(51) Int. Cl.
*G06F 17/00* (2006.01)
*H04L 29/06* (2006.01)
*H04L 12/24* (2006.01)
*G06F 21/60* (2013.01)

(52) U.S. Cl.
CPC .............. *H04L 63/20* (2013.01); *G06F 21/604* (2013.01); *H04L 41/0893* (2013.01); *H04L 63/0263* (2013.01)

(58) Field of Classification Search
CPC .............. G06F 21/604; H04L 63/0263; H04L 41/0893
USPC .......................................................... 726/1
See application file for complete search history.

(56) References Cited

U.S. PATENT DOCUMENTS

| | | | | |
|---|---|---|---|---|
| 7,448,067 | B2 * | 11/2008 | Yadav ................................. | 726/1 |
| 7,661,124 | B2 * | 2/2010 | Ramanathan et al. ............. | 726/1 |
| 8,181,222 | B2 * | 5/2012 | Thomsen et al. .................. | 726/1 |
| 8,261,317 | B2 * | 9/2012 | Litvin et al. ....................... | 726/1 |
| 8,296,820 | B2 * | 10/2012 | Kao et al. .......................... | 726/1 |
| 8,656,503 | B2 * | 2/2014 | Becker ................ | G06F 21/6236 726/27 |
| 9,083,749 | B1 * | 7/2015 | Roth ........................ | H04L 63/20 |
| 2006/0075466 | A1 * | 4/2006 | Ramanathan ....... | H04L 41/0893 726/1 |
| 2006/0184490 | A1 * | 8/2006 | Heim et al. ...................... | 706/46 |
| 2007/0283443 | A1 * | 12/2007 | McPherson ......... | G06F 21/6218 726/26 |
| 2008/0066147 | A1 * | 3/2008 | Dillaway ............. | G06F 21/6236 726/1 |
| 2008/0066150 | A1 * | 3/2008 | Lim .................................. | 726/1 |
| 2010/0005443 | A1 * | 1/2010 | Kwok et al. .................. | 717/100 |
| 2011/0321122 | A1 * | 12/2011 | Mwangi et al. ..................... | 726/1 |
| 2014/0282818 | A1 * | 9/2014 | Singer ................. | G06F 21/6218 726/1 |

OTHER PUBLICATIONS

Becker, M.Y., Fournet, C., Gordon, A.D.: SecPAL: Design and semantics of a decentralized authorisation language. Technical Report MSR-TR-2006-120, Microsoft Research (Sep. 2006).*

* cited by examiner

*Primary Examiner* — Christopher Revak
*Assistant Examiner* — Vadim Savenkov (57) ABSTRACT

A user interface is described, such as a graphical user interface (GUI), operable to receive a representation of a security policy expressed in a first policy language, where that security policy will be supported by policy evaluation engines (or other such components) that are configured to operate using security policies expressed using a second (different) policy language. The representation of the security policy is persisted in a data store in accordance with the first policy language. Subsequently, in response to receiving a request to access a resource, a second representation of the security policy is generated by translating the content of the security policy into a second policy language that is associated with the policy evaluation engine. The second representation of the security policy is then evaluated by the policy evaluation engine to grant or deny access to the resource.

24 Claims, 7 Drawing Sheets

DYNAMIC SECURITY POLICY GENERATION

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

A potential disadvantage to such an approach, at least from a customer point of view, is that the resources typically are at a location under control of the provider of those resources, and thus are out of the direct control of the customer. In order to help ensure that resources allocated to the customer perform tasks only under direction of that customer, customer or provider can utilize one or more security policies that can be used to indicate which requests requiring access to those resources should be allowed, and which should be denied. These security policies can be expressed using a policy language and they can be evaluated by a policy evaluation engine. Some difficulties arise, however, for customers to create and manage the various security policies. For example, some customers of the service provider may prefer to express their respective security policies using different formats, policy languages or interfaces than other customers of the service provider.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing access to various computing resources. In particular, various embodiments provide a user interface, such as a graphical user interface (GUI), operable to receive a representation of a security policy expressed in a first policy language, where that security policy will be supported by policy evaluation engines (or other such components) that are configured to operate using security policies expressed using a second (different) policy language. The policy evaluation engines can control access to various resources (e.g., virtual machines, servers, data stores etc.) within a multitenant and/or shared resource computing environment (e.g., cloud computing environment). In particular, the policy evaluation engines can include the hardware, software or combination thereof that is operable to receive requests to access a resource and evaluate security policies to grant or deny access to that resource.

In various embodiments, a user (e.g., a customer of the service provider) can configure the permissions of the security policy by using the graphical interface. The security policy can be associated with one or more resources or with a principal. For example, a customer may be allowed to choose from a number of preconfigured permission levels to a resource for particular principals through use of drop down menus, radio buttons, or other user interface elements. Once the customer specifies the permission levels, a representation of the security policy is persisted in a database or other storage location. The representation of the security policy is written in accordance with a first policy language.

Once the representation of the security policy has been persisted, a policy evaluation engine may receive a request to access the one or more resources in the multitenant computing environment. For example, a user may request to start/stop a virtual machine instance, interact with an application, access data, or perform other such action. In response to receiving the request, all security policies applicable to the request may be retrieved and provided to the policy evaluation engine. In one embodiment, the policy evaluation engine is configured to operate using security policies written in a second (different) policy language from the policy language of the security policy specified by the customer using the interface. Thus, the policy engine (or other access management component) may dynamically generate a second representation of the security policy (e.g., document) in response to the request, by translating the content of the representation persisted in the data store from one policy language into a different policy language.

The policy evaluation engine can then evaluate the second representation of the security policy, as well as all other security policies applicable to the request to grant or deny access to one or more resources in the multitenant computing environment. In at least some embodiments, the second representation of the security policy can further restrict the scope of authority granted by the other applicable security policies.

In various embodiments, the policy translation as described herein can be utilized in a multi-tenant shared resource environment, often referred to as a cloud computing environment. Conventionally, in this type of environment, host computing devices utilize virtualization technology to provision one or more virtual machine instances that are associated with different customers of a service provider (e.g., cloud computing provider). These virtual machine instances are hosted on the computing device using a hypervisor (or other virtualization technology) and each virtual machine instance can contain a guest operating system, including a kernel, device drivers and other OS components. The host computing devices and other physical resources to host the virtual machines are usually provided by the service provider and reside in resource centers, such as a data centers, server farms, content delivery network (CDNs) points-of-presence (POPs) and the like.

Figure 1:
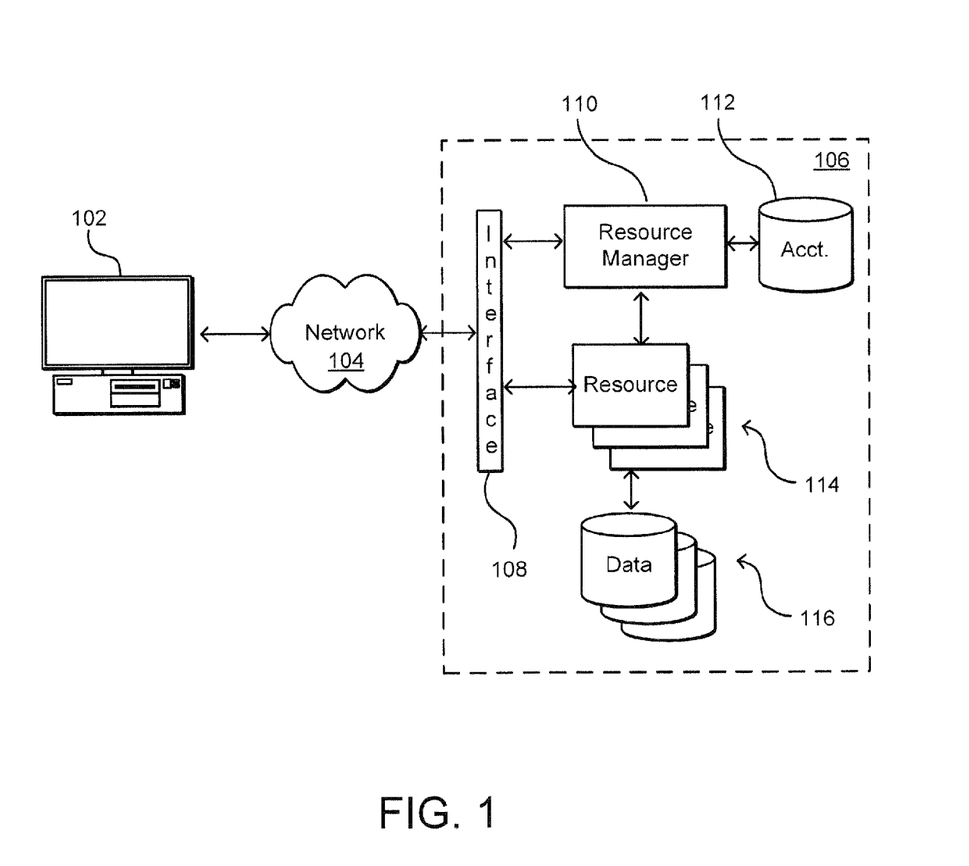
FIG. 1 illustrates an example environment in which aspects of the various embodiments can be implemented.

FIG. 1 illustrates an example environment 100 in which aspects of the various embodiments can be implemented. In this example a customer of a multi-tenant environment 106 is able to utilize a client device 102 to submit requests across at least one network 104 to at least one designated address or interface of the multi-tenant environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The multi-tenant environment 106 can be supported and/or offered by a resource provider, and can include any appropriate components for receiving requests and returning information or performing actions in response to those requests. As an example, the environment might include Web servers and/or application servers for receiving and processing requests, then returning data, Web pages, video, audio, or other such content or information in response to the request. In many cases, the customer will have an account with the provider of the multi-tenant environment that indicates which resources or types of resources the customer can access, an amount of that access, types of tasks that can be performed with that access, or other such terms. One or more users might be associated with the customer, and thus can be able to access the resources per the customer account.

In various embodiments, the environment 106 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant environment is often referred to as resource sharing, Web services, or "cloud computing," among other such terms and depending upon the specific environment and/or implementation. In this example the multi-tenant environment includes a plurality of resources 114 of one or more types. These types can include, for example, application servers operable to process instructions provided by a user or database servers operable to process data stored in one or more data stores 116 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 114 can submit a request that is received to an interface layer 108 of the multi-tenant environment 106. The interface layer can include application programming interfaces (APIs) or other exposed interfaces enabling a user to submit requests to the multi-tenant environment. The interface layer 108 in this example can also include other components as well, such as at least one Web server, routing components, load balancers, and the like. When a request to provision a resource is received to the interface layer 108, for example, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account, or is associated with a customer having an existing account, with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, however, certain customers might want more assurance that requests received to a distributed environment are properly evaluated, such that only requests meeting certain criteria are able to access resources or services associated with that customer. The customer may also wish to express the permissions and access criteria using a policy language that is suited for their organization. In some situations, that policy language may be different from the policy language that is generally utilized by the service provider to express security policies.

Figure 2:
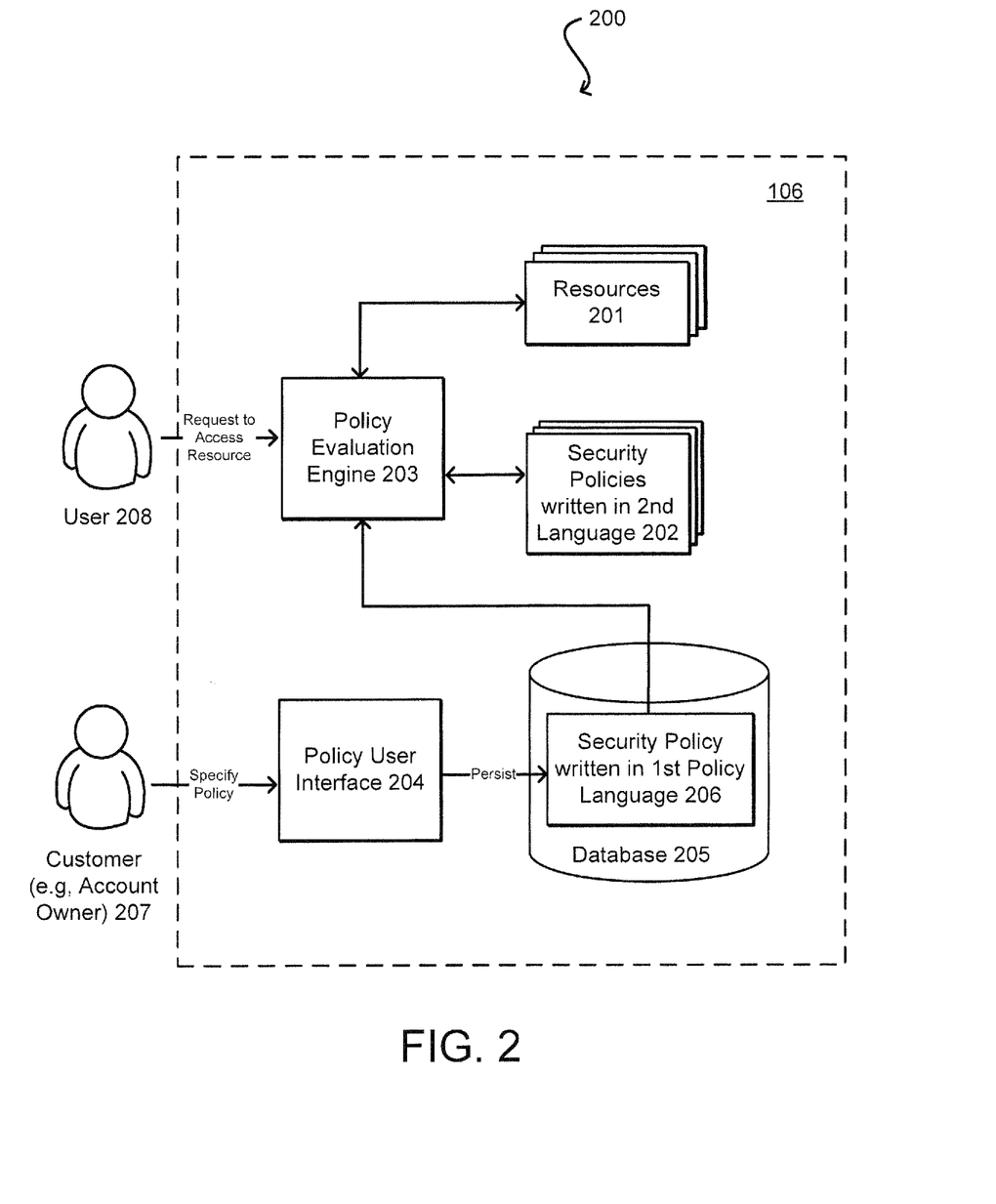
FIG. 2 illustrates an example of dynamically generating security policies, in accordance with various embodiments.

FIG. 2 illustrates an example 200 of dynamically generating security policies, in accordance with various embodiments. In the illustrated embodiment, a customer 207 or owner of the account can utilize a graphical user interface 204 to specify a security policy for controlling access to one or more resources 201 associated with that account. The one or more resources in the distributed environment may include servers, virtual machines, processing components, buckets, queues, data stores, or other such components. The graphical user interface 204 may include radio buttons, drop down menus and other graphical elements that can be used by the customer to express the permissions of the security policy. The graphical user interface 201 will be described in further detail below, with reference to FIG. 3.

Once the customer 207 specifies the permissions of the security policy, a representation 206 of the security policy is persisted in a database 205 or other data store. The representation 206 is written according to a first policy language and the database 205 may be configured to store policies written in the first policy language. In some embodiments, the user interface may be coupled to the database 205 such that it only allows the creating and editing of security policies in that database 205. In various embodiments, the first policy language can be any format or standard that can be used to express the permissions of a security policy that can be used to control access to resources. The policy control language in some embodiments includes an access control language that has multiple representations. These representations can include, for example, a binary machine-readable format, a domain-specific language, a standards-compliant format corresponding to a federation provider, a representation in a known language such as JSON, a representation optimized for a specific task, and so on. Thus, in addition to a base representation there can be several domain-specific representations or higher-level representations, which in at least some embodiments must be compiled or translated down to a lower or earlier representation in order to be processed by one or more evaluation engines in the environment. In at least some embodiments, the policy language can be represented by a schema, such as an extensible markup language (XML) schema. In one embodiment, the representation of the security policy can be stored in the form of pairs comprising a user identifier and a permission level, where the permission level is selected from the set consisting of manage the resource, view the resource, deploy the resource, or none (e.g., deny access to the resource).

In the illustrated embodiment, when a user submits a request, such as a web services application programming interface (API) request to access a resource, a set of security policies applicable to the request may be retrieved and provided to a policy evaluation engine 203 and the policy evaluation engine 203 may apply one or more security policies 202 to control access to those resources. Those security policies 202 may be written in accordance with the native policy language of the policy evaluation engine 203, i.e., a second policy language that has different rules and semantics from the first policy language. The policy evaluation engine may be implemented as one or more libraries running on one or more host computing devices, which are responsible for evaluating requests for access to the resources. When a request is received, the host invokes the policy evaluation engine and passes the information about the request, including any security policies applicable to the request to the policy evaluation engine. The policy evaluation engine 203 may then inspect the information in the request and evaluate all of the security policies 202 that are applicable to the request in order to grant or deny access to the request, among other such options.

In addition to evaluating the security policies 202 written in the native policy language of the policy engine 203, the policy engine (or other access management component) can also dynamically generate a second representation of the security policy 206 by translating the content of the first representation 206 from the first policy language into a second policy language. The second representation of the security policy is also evaluated to grant or deny access to the resources 201. In at least some embodiments, the second representation of the security policy further restricts the scope of authority granted by the security policies 202 written in the native language of the policy evaluation engine 203.

It should be noted that in at least some embodiments, the graphical user interface 204 is configured specifically for editing and creating security policies in the database 202 and the GUI 204 is not allowed to directly edit or modify the security policies 202 native to the policy evaluation engine 203. In some situations, it may be undesirable for the service provider to allow the interface to edit the security policies and permissions that may be unrelated to the security policy 206. By instead storing the permissions in a context associated with the resource and reconstituting them for the request where the permissions are relevant, the embodiments described herein enable a number of different security systems to edit their own policies without interfering with the policies in the main system, i.e., the native policies of the policy engine.

In some embodiments, the resources of the customer may be organized in a resource hierarchy. The graphical user interface 204 can enable the customer to specify permissions on a high level object (e.g., stack, deployment) that will be applicable to all objects underneath that high level object. This may make it simpler for the user to specify the permissions by reducing the number of objects for which the security policy needs to be explicitly specified. For example, one high level object in the resource hierarchy may be a "stack" that contains all of the resources needed to run an application on behalf of the customer, such as virtual machine instances, application servers, databases, and the like. The customer may specify one security policy for the entire stack, where that security policy will be applied to each resource in the stack. Once the customer specifies the permissions, the permissions are stored on the high level object (e.g., stack). The translated representations of the policy that are generated at request time have a path down to the actual object on the lower level of the hierarchy. Thus, when a request is received for a resource in the stack, the access management component (e.g., policy engine, etc.) generates a translated representation of the security policy for that resource. For example, if permissions are set for a stack, the system can generate a translated representation for an instance that is part of the stack (underneath it in the hierarchy). In one embodiment, when the permission is specified using the UI, it is stored on the high level object (stack) but when the translated representations of the security policy are generated, they are generated for each lower level object with the path down to the requested object. The stack based policy gets translated at runtime into a policy on the stack, as well as policies for each individual object in the stack.

Figure 3:
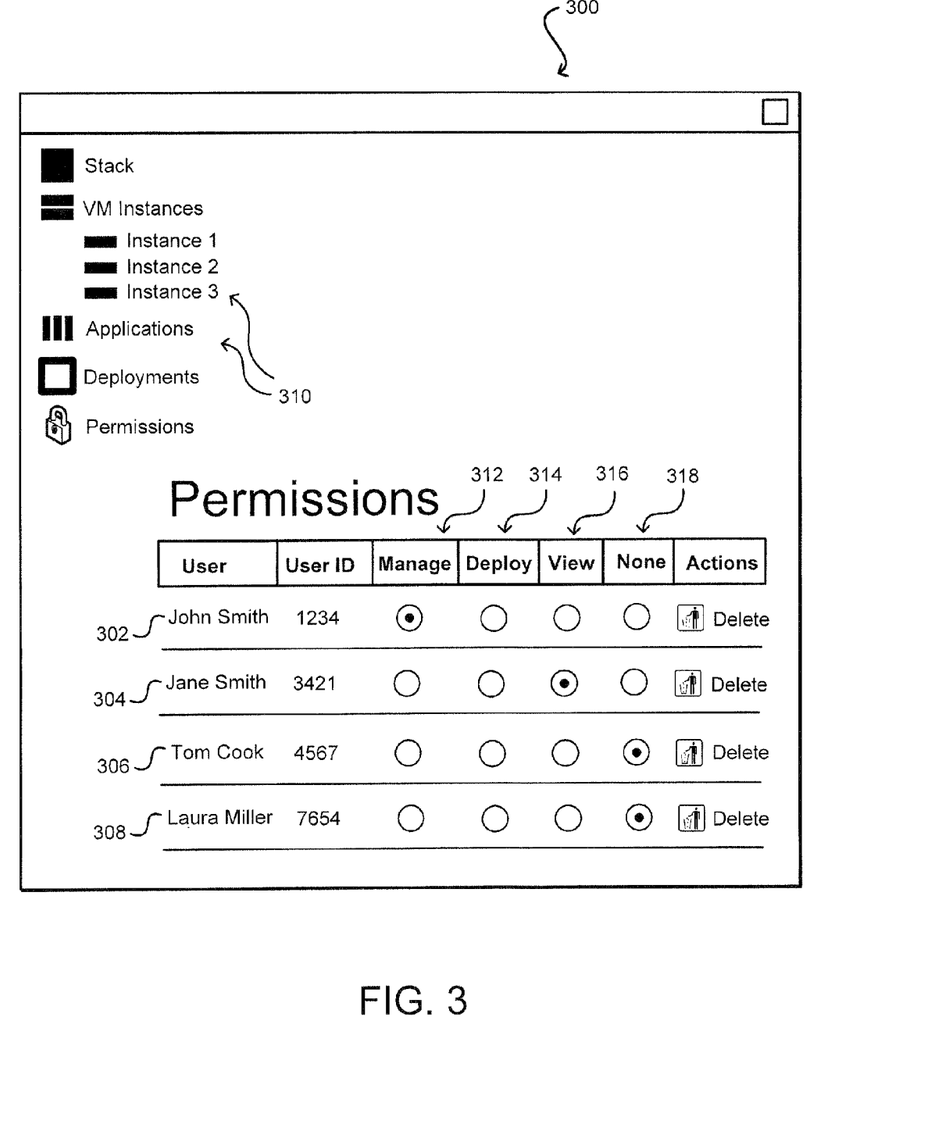
FIG. 3 illustrates an example of a graphical user interface that is operable to receive a representation of a security policy, in accordance with various embodiments.

FIG. 3 illustrates an example 300 of a graphical user interface that is operable to receive a representation of a security policy, in accordance with various embodiments. As previously discussed, the interface may include any number of graphical elements that can be used by the customer to specify the permissions of the security policy associated with one or more resources. In the illustrated, embodiment, the graphical user interface 300 enables the customer to select one or more resources from a list of resources 310 to which the specified security policy will be applied. For example, the customer may select a stack, a virtual machine instance, an application, or a deployment, for which to specify the security policy. As described above, the resources may be organized in a resource hierarchy with certain objects (e.g., stack) being higher in the hierarchy than other objects (e.g., virtual machine instance). In some embodiments, the customer may select a higher order object for which to specify a security policy, and the security policy will be applied to all lower order objects in the hierarchy.

In the illustrated embodiment, a customer may select one of a set of preconfigured permissions (312, 314, 316, 318) to a resource (or a set of resources) for one or more principals (302, 304, 306, 308), such as a user or a group of users. For example, as shown in the illustration, the customer may utilize one or more radio buttons to specify that user "John Smith" 302 has permissions to manage the resource, user "Jane Smith" 304 has permissions to view the resource, and users "Tom Cook" 306 and "Laura Miller" 308 do not have permissions to perform any action on the resource. The interface may also provide elements to add or remove principals from the resource.

Figure 4:
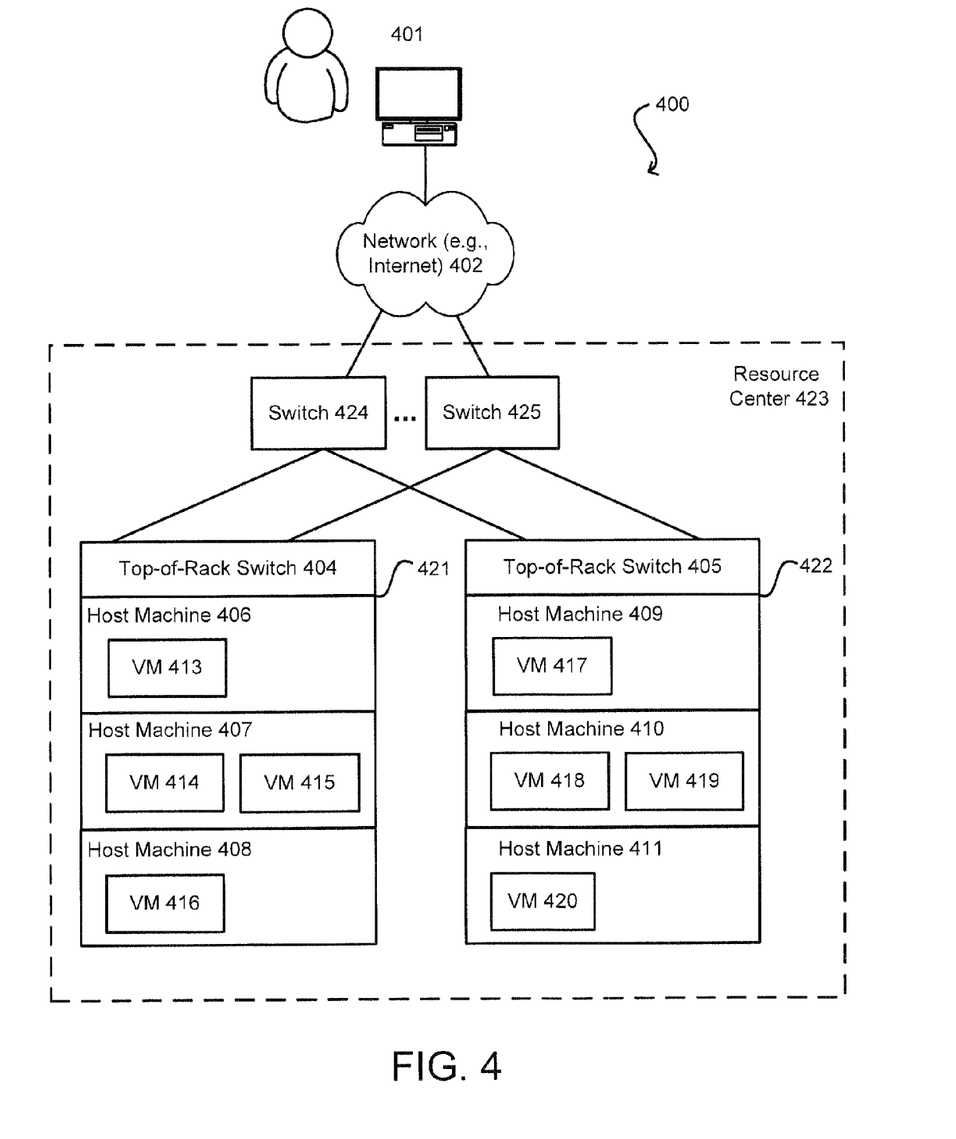
FIG. 4 illustrates an example of a resource center environment of the service provider, in accordance with various embodiments.

FIG. 4 illustrates an example 400 of a resource center environment of the service provider, in accordance with various embodiments. In the illustrated embodiment, a service provider (e.g., a cloud computing resource provider) can maintain one or more resource centers 423 (e.g., data centers, server farms, etc.) that store the physical resources (e.g., host computing devices, etc.) of the service provider. These physical resources can be used to host a number of virtual machine instances or virtual servers that can be provided to users 401 over a network 402, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like. Access to all of these resources provisioned for the user (e.g., customer) may be controlled by using one or more security policies specified by the user, as previously described.

In the illustrated example, the resource center 423 of the service provider may include one or more racks 421, 422 of host computing devices (406, 407, 408, 409, 410) wherein each host computing device on a particular rack is connected to a single top-of-rack (TOR) switch (404, 405). These TOR switches can be further connected to one or more other switches (424, 425) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (413, 414, 415, 416, 417, 418, 419, 420) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider.

Figure 5:
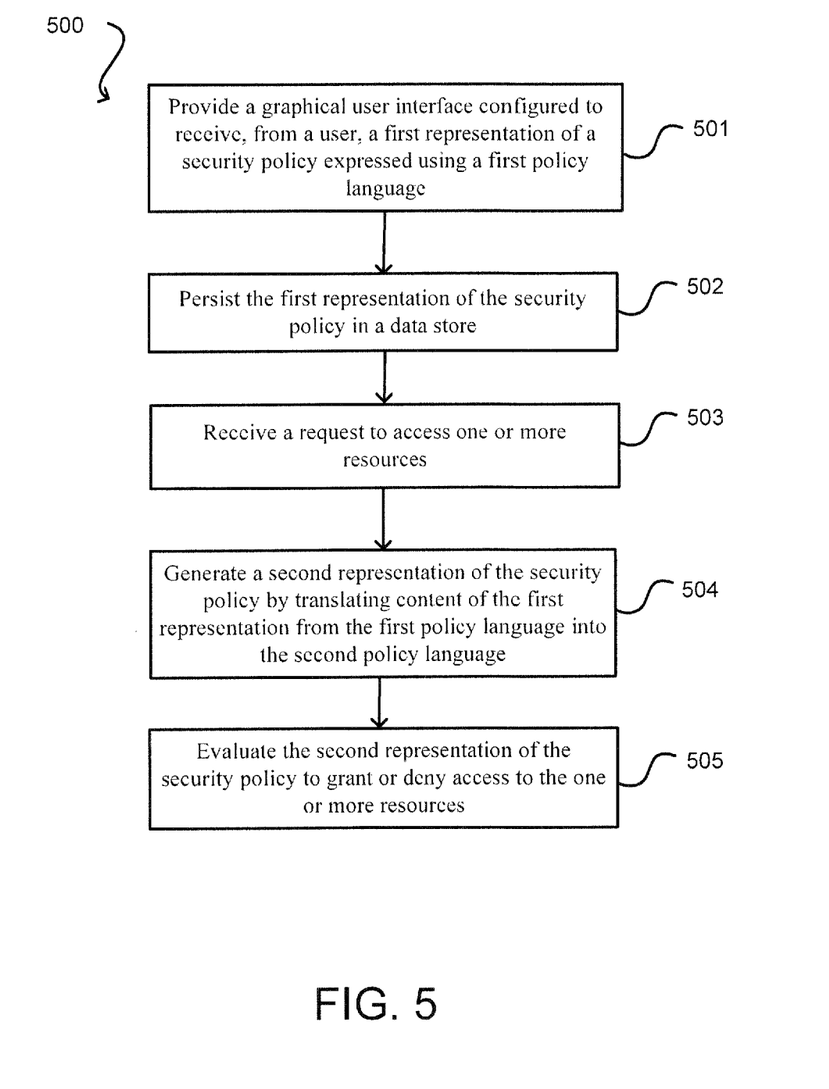
FIG. 5 illustrates an example process for dynamically generating security policies, in accordance with various embodiments.

FIG. 5 illustrates an example process 500 for dynamically generating security policies, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, a graphical user interface is provided to a customer or other user that owns an account with resources. The interface is operable to receive, from the customer, a first representation of a security policy expressed using a first policy language. The security policy will be used to control access to one or more resources in a distributed computing environment, such as virtual machines, servers, databases and the like. In operation 502, the first representation of the security policy is persisted in a database or other such data store. The first representation of the security policy is stored in the format of the first policy language. In one embodiment, the interface is coupled to the database and is particularly configured to create, read and update security policies in that database, such that the interface is not permitted to edit or create policies in other data stores.

In operation 503, once the policy has been persisted, a request to access one or more resources may be received in the distributed computing environment. For example, the request may be a web services API request from a user submitted over a network to access a resource, such as a virtual machine, server or application. In response to receiving the request, the policy evaluation engine or other access management component generates a second representation of the security policy by translating content of the first representation persisted in the data store from the first policy language into a second policy language (e.g., native policy language of the policy evaluation engine), as shown in operation 504. In addition, as previously described, if the security policy was stored on the high level object in a hierarchy, such as a stack, then the policy evaluation engine translates the stack based security policy at runtime into a security policy on the stack, as well as policies for each individual object in the stack. In addition to translating the first representation of the security policy, all other security policies that are applicable to the request are retrieved, such as security policies expressed in the native second policy language of the policy evaluation engine. For example, the API (or other component) receiving the request may cause all security policies applicable to the request be provided to the policy evaluation engine, where those security policies are expressed using the policy language of the policy evaluation engine.

In operation 505, the policy evaluation engine evaluates the generated second representation of the security policy, as well as all of the retrieved security policies applicable to the request in order to grant or deny access to one or more resources in the distributed computing environment. As previously mentioned, the second representation of the security policy may further restrict the access scope of authority of the other security policies applicable to the request.

Figure 6:
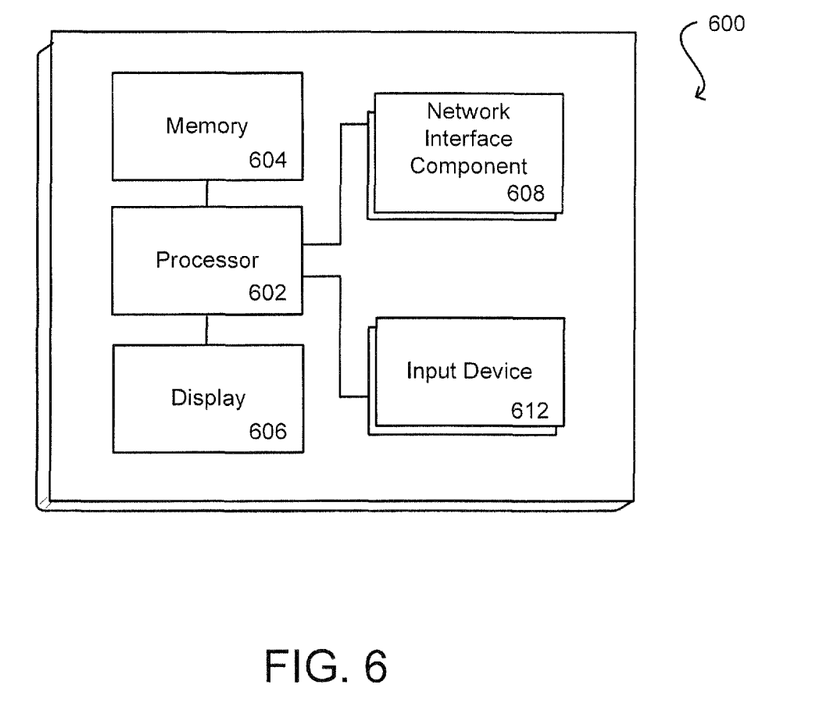
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
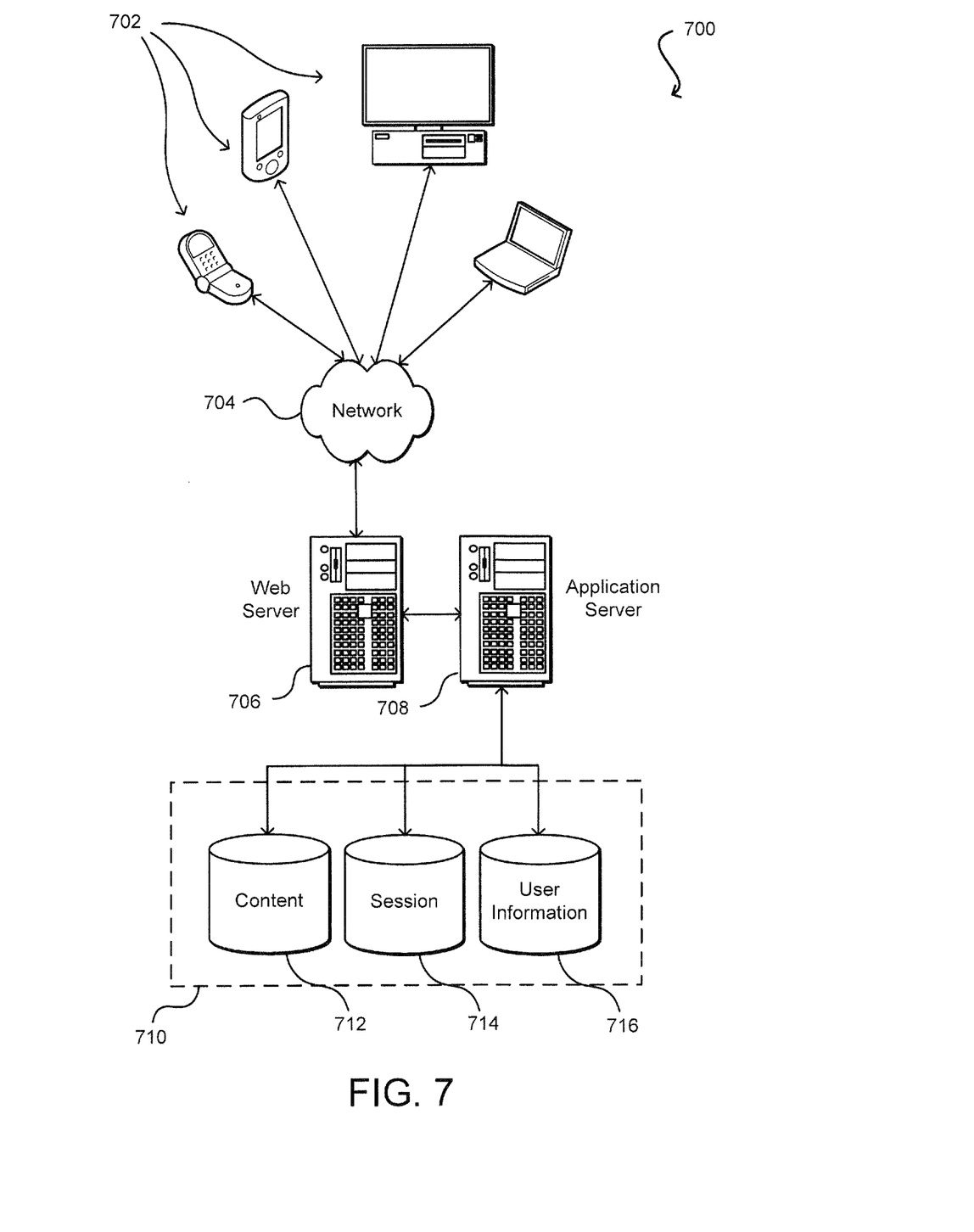
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail, Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Per, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for supporting multiple languages of security policies, the method comprising:
   providing a graphical user interface configured to receive, from a user, a first representation of a first security policy expressed using a first policy language, the first security policy configured to control access to one or more resources in a distributed computing environment;
   persisting the first representation of the first security policy in a data store;
   receiving a request to access the one or more resources in the distributed computing environment;
   retrieving additional security policies expressed in a second policy language that are applicable to the request;
   generating a second representation of the first security policy by translating content of the first representation persisted in the data store from the first policy language into the second policy language, the second representation configured to modify a scope of authority of the user granted by the first representation of the first security policy; and
   evaluating the second representation of the first security policy and the additional security policies both in the second policy language to grant or deny access to the one or more resources in the distributed computing environment.

2. The computer implemented method of claim 1, wherein the second representation restricts a scope of authority granted by the retrieved security policies expressed in the second policy language.

3. The computer implemented method of claim 1, wherein the one or more resources are arranged in a hierarchy, wherein the first representation of the security policy is associated with a first resource in the hierarchy and wherein the second representation of the security policy is associated with a second resource that is located underneath the first resource in the hierarchy.

4. A computer implemented method, comprising:
   receiving, by way of a user interface, a first representation of a first security policy expressed using a first policy language, the first security policy configured to control access to one or more resources;
   receiving a request to access the one or more resources;
   retrieving additional security policies expressed in a second policy language that are applicable to the request;
   generating a second representation of the first security policy by translating content of the first representation from the first policy language into a second policy language, the second policy language associated with a policy evaluation engine operable to control access to the one or more resources, the second representation configured to modify a scope of authority of the user granted by the first representation of the first security policy; and
   evaluating, by the policy evaluation engine, the second representation of the first security policy and the additional security policies both in the second policy language to grant or deny access to the one or more resources.

5. The computer implemented method of claim 4, wherein receiving the first representation of the security policy is generated from input received from a graphical user interface (GUI).

6. The computer implemented method of claim 4, further comprising:
   persisting the first representation of the security policy into a data store coupled with the user interface, the data store configured to store security policies expressed using the first policy language.

7. The computer implemented method of claim 4, wherein the one or more resources are arranged in a hierarchy, wherein the first representation of the security policy is associated with a first resource in the hierarchy and wherein the second representation of the security policy is associated with a second resource that is located underneath the first resource in the hierarchy.

8. The computer implemented method of claim 7, wherein generating the second representation further comprises:
   generating the second representation of the security policy for each resource that is located between the first resource and the second resource within the hierarchy.

9. The computer implemented method of claim 4, wherein the first representation of the security policy further comprises:
   a user identifier and a permission level associated with a resource, wherein the permission level includes at least one of: a permission level that grants an ability to manage the resource, a permission level that grants an ability to view the resource, a permission level that grants an ability to deploy the resource, or a permission level that denies any access to the resource.

10. The computer implemented method of claim 4, wherein evaluating the second representation further comprises:
    processing any security policies expressed using the second policy language that are applicable to the request; and
    evaluating the second representation in combination with the retrieved security policies, wherein the second representation restricts a scope of authority granted by the retrieved security policies.

11. The computer implemented method of claim 10, wherein the user interface is not capable of modifying any security policies expressed using the second policy language.

12. The computer implemented method of claim 4, wherein receiving the request further comprises receiving at least one application programming interface (API) request over a network to access the one or more resources, the one or more resources provisioned for a customer in a multitenant computing environment.

13. A computing device, comprising:
    at least one processor; and
    memory including instructions that, when executed by the at least one processor, cause the computing device to:
       receive, via a user interface, a first representation of a first security policy expressed using a first policy language, the first security policy configured to control access to one or more resources;

receive a request to access the one or more resources;
retrieve additional security policies expressed in a second policy language that are applicable to the request;
generate a second representation of the first security policy by translating content of the first representation from the first policy language into a second policy language, the second policy language associated with a policy evaluation engine operable to control access to the one or more resources, the second representation configured to modify a scope of authority of the user granted by the first representation of the first security policy; and
evaluate, by the policy evaluation engine, the second representation of the first security policy and the additional security policies both in the second policy language to grant or deny access to the one or more resources.

14. The computing device of claim 13, wherein receiving the first representation of the security policy is generated from input received from a graphical user interface.

15. The computing device of claim 13, wherein the one or more resources are arranged in a hierarchy, wherein the first representation of the security policy is associated with a first resource in the hierarchy and wherein the second representation of the security policy is associated with a second resource that is located underneath the first resource in the hierarchy.

16. The computing device of claim 15, wherein generating the second representation further comprises:
generating the second representation of the security policy for each resource that is located between the first resource and the second resource within the hierarchy.

17. The computing device of claim 13, wherein the first representation of the security policy further comprises:
a user identifier and a permission level associated with a resource, wherein the permission level includes at least one of: a permission level that grants an ability to manage the resource, a permission level that grants an ability to view the resource, a permission level that grants an ability to deploy the resource, or a permission level that denies any access to the resource.

18. The computing device of claim 13, wherein evaluating the second representation further comprises:
processing any security policies expressed using the second policy language that are applicable to the request; and
evaluating the second representation in combination with the retrieved security policies, wherein the second representation restricts a scope of authority granted by the retrieved security policies.

19. A non-transitory computer readable storage medium storing one or more sequences of instructions executed by one or more processors to:
receive, via a user interface, a first representation of a first security policy expressed using a first policy language, the first security policy configured to control access to one or more resources;
receive a request to access the one or more resources;
retrieve additional security policies expressed in a second policy language that are applicable to the request;
generate a second representation of the first security policy by translating content of the first representation from the first policy language into a second policy language, the second policy language associated with a policy evaluation engine operable to control access to the one or more resources, the second representation configured to modify a scope of authority of the user granted by the first representation of the first security policy; and
evaluate, by the policy evaluation engine, the second representation of the first security policy and the additional security policies both in the second policy language to grant or deny access to the one or more resources.

20. The non-transitory computer readable storage medium of claim 19, wherein the one or more resources are arranged in a hierarchy, wherein the first representation of the security policy is associated with a first resource in the hierarchy and wherein the second representation of the security policy is associated with a second resource that is located underneath the first resource in the hierarchy.

21. The non-transitory computer readable storage medium of claim 20, wherein generating the second representation further comprises:
generating the second representation of the security policy for each resource that is located between the first resource and the second resource within the hierarchy.

22. The non-transitory computer readable storage medium of claim 19, wherein evaluating the second representation further comprises:
processing any security policies expressed using the second policy language that are applicable to the request; and
evaluating the second representation in combination with the retrieved security policies, wherein the second representation restricts a scope of authority granted by the retrieved security policies.

23. The non-transitory computer readable storage medium of claim 19, wherein receiving the request further comprises receiving at least one application programming interface (API) request over a network to access the one or more resources, the one or more resources provisioned for a customer in a multitenant computing environment.

24. The non-transitory computer readable storage medium of claim 19, wherein the user interface is not capable of modifying any security policies expressed using the second policy language.

* * * * *